(12) United States Patent
Hyun et al.

(10) Patent No.: US 7,508,860 B2
(45) Date of Patent: Mar. 24, 2009

(54) PULSE SIGNAL GENERATOR FOR ULTRA-WIDEBAND RADIO TRANSCEPTION AND RADIO TRANSCEIVER HAVING THE SAME

(75) Inventors: Seok-Bong Hyun, Daejeon (KR); Geum-Young Tak, Seoul (KR); Byung Jo Kim, Daejeon (KR); Kyung Hwan Park, Daejeon (KR); Jeen Hur, Kyungki-do (KR); Seong-Su Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 609 days.

(21) Appl. No.: 11/004,383

(22) Filed: Dec. 3, 2004

(65) Prior Publication Data

US 2005/0141602 A1 Jun. 30, 2005

(30) Foreign Application Priority Data

Dec. 26, 2003 (KR) .................. 10-2003-0097246
Nov. 5, 2004 (KR) .................. 10-2004-0089721

(51) Int. Cl.
*H04B 1/00* (2006.01)

(52) U.S. Cl. .................. 375/130; 375/133; 375/135; 375/136; 375/140; 375/141; 375/142; 375/143; 375/144; 375/145; 375/146; 375/147; 375/148; 375/149; 375/150; 375/151; 375/152; 375/220; 375/222; 375/223; 375/307; 375/308; 375/327; 375/329; 375/339; 375/348

(58) Field of Classification Search .................. 375/133, 375/135–136, 140–152, 220, 222–223, 307–308, 375/327, 329, 339, 348
See application file for complete search history.

(56) References Cited

U.S. PATENT DOCUMENTS

| 6,026,125 | A |   | 2/2000 | Larrick, Jr. et al. |
| 6,157,686 | A | * | 12/2000 | Iinuma .................. 375/347 |
| 6,347,121 | B1 | * | 2/2002 | Sointula .................. 375/259 |
| 6,356,594 | B1 | * | 3/2002 | Clement et al. .......... 375/261 |
| 6,505,032 | B1 |   | 1/2003 | McCorkle et al. |

(Continued)

OTHER PUBLICATIONS

"Ultra-wide Bandwidth Time-Hopping Spread-Spectrum Impulse Radio for Wireless Multiple-Access Communications", IEEE Transactions on Communications, vol. 48, No. 4, Apr. 2000, pp. 679-691.

*Primary Examiner*—Shuwang Liu
*Assistant Examiner*—Kabir A Timory
(74) *Attorney, Agent, or Firm*—Blakely, Sokoloff, Taylor & Zafman LLP

(57) ABSTRACT

Provided are a pulse signal generator for UWB radio transception and a radio transceiver having the same. The pulse signal generator includes: an envelope generator generating a plurality of envelope signals; a local oscillator array composed of a plurality of high frequency oscillators, each outputting two oscillation signals having a phase difference from each other; a multiplier array receiving the envelope signals and the oscillation signals and outputting signals obtained by respectively multiplying the envelope signals by the oscillation signals; and an I channel adder and a Q channel adder outputting an I channel pulse signal and a Q channel pulse signal by adding output signals having the same phase components among the signals output from the multiplier array, respectively.

13 Claims, 12 Drawing Sheets

U.S. PATENT DOCUMENTS

| | | | |
|---|---|---|---|
| 6,690,748 B2 * | 2/2004 | Martin | 375/324 |
| 6,731,917 B1 * | 5/2004 | Krishna | 455/205 |
| 2002/0118834 A1 * | 8/2002 | Wilson et al. | 380/222 |
| 2003/0072389 A1 * | 4/2003 | Li et al. | 375/308 |
| 2004/0106380 A1 * | 6/2004 | Vassiliou et al. | 455/73 |

* cited by examiner

PULSE SIGNAL GENERATOR FOR ULTRA-WIDEBAND RADIO TRANSCEPTION AND RADIO TRANSCEIVER HAVING THE SAME

BACKGROUND OF THE INVENTION

This application claims the priority of Korean Patent Application Nos. 2003-97246, filed on Dec. 26, 2003 and 2004-89721, filed on Nov. 5, 2004, in the Korean Intellectual Property Office, the disclosures of which are incorporated herein in their entirety by reference.

1. Field of the Invention

The present invention relates to an ultra-wideband (UWB) radio device, and more particularly, to a pulse signal generator for UWB radio transception and a radio transceiver having the same.

2. Description of the Related Art

According to increasing necessity of radio transmission performance and unique location awareness capability of ultra high speed multimedia data of hundreds Mbps through 1 Gbps classes, UWB radio technology is significantly considered in radio communication, imaging, and sensor fields. Basic structures of methods of carrier-free pulse radio devices using the UWB radio technology are already disclosed. Recently, according to permission of commercialization of the radio communication field, various methods of using the UWB radio technology for wireless personal area networks (WPANs) has been suggested.

The UWB radio technology can be largely classified into technology using a single band and technology using a multi-band. In the technology using the single band, there exist a carrier-free pulse-based method and a direct sequence code division multiple access (DS-CDMA) method using a constant carrier. In the technology using the multi-band, there exist a frequency hopping orthogonal frequency division multiplexing (FH-OFDM) method and a multi-band pulse method.

FIG. 1 is a block diagram of a conventional UWB transceiver to which the various radio technologies can be applied.

Referring to FIG. 1, the conventional UWB transceiver includes a radio controller-media access controller (RC-MAC) 110, which is connected to a host or peripherals, an encoder/modulator 120 and a UWB pulse signal generator 130, of which a transmitter is composed, a switch/duplexer 140, an antenna 150, a receiver front-end/correlator 160 and a decoder/demodulator/synchronizer 170, of which a receiver is composed, and a clock/timing generator 180.

FIG. 2 is a block diagram of a conventional UWB transceiver adopting the DS-CDMA method among conventional UWB transceivers.

Referring to FIG. 2, a transmission line, which receives scrambled baseband bitstream data and generates an RF output, a forward error correction (FEC) encoder 202, a preamble prepender 204, a symbol mapper 206, a code set modulator 208, a radio resource controller (RRC)/low-pass filter (LPF) 210, and a multiplier 212. A reception line, which receives an RF input and generates demodulated bitstream data, includes a receiver front-end/correlator 216, a demodulator 218, a synchronizer/channel estimator 220, a decision feedback equalizer (DFE) 222, a deinterleaver 224, and an FEC decoder 226. The conventional UWB transceiver includes a clock/timing generator 214, which provides clock signals and timing signals to the transmission line and the reception line, besides the transmission line and the reception line.

FIG. 3 is a waveform diagram illustrating a UWB impulse signal generated by the UWB transceiver of FIG. 2. FIG. 4 is a power spectrum illustrating the UWB impulse signal of FIG. 3.

Referring to FIGS. 3 and 4, the baseband bitstream data passed through the FEC encoder 202 and the preamble prepender 204 is converted to a spectrum-spread chip signal 301 by passing through the symbol mapper 206 and the code set modulator 208, the chip signal 301 is output as a pulse wavelet type output signal 302 by a pulse generator including the RRC/LPF 210 and the multiplier 212.

In the UWB transceiver, a bandwidth and an out-of-band spurious level are determined according to a pulse wavelet type of the output signal 302. When UWB modules using the conventional DS-CDMA method, whose pulse widths are very narrow, are close within several cm, a performance degradation effect due to interference can occur. The DS-CDMA method requires an equalizer (222 of FIG. 2), which can compensate for time delay spread due to multi-path fading and inter-symbol interference due to the time delay spread. However, it is difficult to realize an equalizer when a data transmission rate is high over hundreds Mbps. Due to this problem, in mobile communication for high speed multimedia communication, the OFDM method or a multi-carrier (MC)-CDMA method in which the OFDM method and the CDMA method is combined method is adopted rather than the DS-CDMA. In particular, the OFDM method or the MC-CDMA method shows excellent performance in a frequency selective fading environment.

A structure of a waveform adaptive ultra-wideband transmitter is disclosed in U.S. Pat. No. 6,026,125. Since the waveform adaptive ultra-wideband transmitter includes an oscillator generating a constant carrier signal and an envelope generator called a low-level impulse generator, the structure of the waveform adaptive ultra-wideband transmitter is very similar to a structure of a transmitter according to the multi-band pulse method. Therefore, in the structure described above, a constant carrier is used, a bandwidth of a transmission wave can be optionally controlled according to filter characteristics of a waveform adapter, and frequency hopping is possible by changing a frequency of the oscillator generating the carrier.

However, a variable range of an output frequency of a general oscillator is not wide such as can accommodate all the frequency range required by a high speed WPAN standard, e.g., 3.1-10.6 GHz, and phase noise increases in proportion to an increase of an oscillator frequency range. A phase modulation method having the highest spectrum efficiency must be used for ultra high speed transmission, and a center frequency of a UWB signal must be exactly designated for signal restoration. To use the phase modulation method and exactly designate the center frequency, a phase lock loop (PLL) must be used. However, the PLL requires a certain time called a lock time until a frequency is changed and stable, and since the lock time is commonly taken over several micro seconds, it is difficult to obtain very fast (within several nano seconds) frequency hopping characteristics required in the multi-band pulse method or the FH-OFDM method with the PLL. Furthermore, the PLL can generate only continuous wave signals not various type pulses. As the results, a UWB DS-CDMA method and the FH-OFDM method cannot be accommodated with one transceiver.

SUMMARY OF THE INVENTION

The present invention provides a pulse signal generator for ultra-wideband (UWB) transception that enables generation of various type pulse signals.

The present invention also provides a transceiver including the pulse signal generator.

According to an aspect of the present invention, there is provided a pulse signal generator for ultra-wideband transception comprising: an envelope generator generating a plurality of envelope signals; a local oscillator array composed of a plurality of high frequency oscillators, each outputting two oscillation signals having a phase difference from each other; a multiplier array receiving the envelope signals and the oscillation signals and outputting signals obtained by respectively multiplying the envelope signals by the oscillation signals; and an I channel adder and a Q channel adder outputting an I channel pulse signal and a Q channel pulse signal by adding output signals having the same phase components among the signals output from the multiplier array, respectively.

At least one of the envelope signals may include at least one envelope waveform having a predetermined pattern in a predetermined time period.

The number of envelope signals may be the same as the number of bands to be used.

The local oscillator array may be composed of a PLL type frequency synthesizer array including a plurality of voltage control oscillators and frequency dividers.

The frequency synthesizer array may output at least two carriers having predetermined frequency separation, and the frequency separation between adjacent carriers may be over hundreds MHz.

The multiplier array may comprise a number of multipliers, which have identical electrical characteristics with each other.

The pulse signal generator may further comprise a first buffer and a second buffer transmitting both of the I channel pulse signal output from the I channel adder and the Q channel pulse signal output from the Q channel adder to a transmission line and a reception line, respectively.

According to another aspect of the present invention, there is provided a pulse signal generator comprising: a gating logic generating a signal for informing of a generation time of a pulse to be made in response to a delayed clock signal; an envelope generator generating a plurality of envelope signals corresponding to the signal output from the gating logic; a phase modulator receiving a baseband transmission data signal transmitted through a transmission line, the signal output from the gating logic, and the envelope signals generated by the envelope generator and outputting phase modulated envelope waveforms to correspond to logic values of the baseband transmission data signal; a local oscillator array composed of at least two oscillators outputting oscillation signals of trigonometric function waves having predetermined frequencies; a multiplier array receiving the envelope waveforms output from the phase modulator and the oscillation signals output from the local oscillator array; and an I channel adder and a Q channel adder outputting an I channel pulse signal and a Q channel pulse signal by adding output signals having the same phase components among the signals output from the multiplier array, respectively.

According to another aspect of the present invention, there is provided an ultra-wideband (UWB) transceiver comprising: a clock generator generating a clock signal; a variable time delayer receiving the clock signal output from the clock generator and outputting time-delayed signals delayed by integer times a predetermined time; an envelope generator generating a plurality of envelope signals repeating in a predetermined time period according to the time-delayed signals output from the variable time delayer; a local oscillator array composed of a plurality of high frequency oscillators, each outputting two oscillation signals having a 90° phase difference from each other; a multiplier array receiving the envelope signals and the oscillation signals and outputting signals obtained by respectively multiplying the envelope signals by the oscillation signals; an I channel adder and a Q channel adder outputting an I channel pulse signal and a Q channel pulse signal by adding output signals having the same phase components among the signals output from the multiplier array, respectively; an I channel transmission mixer and a Q channel transmission mixer mixing a baseband transmission data signal and the pulse signals output from the I channel adder and Q channel adder, respectively; and an I channel quadrature mixer and a Q channel quadrature mixer receiving a reception signal received via an antenna and the pulse signals output from the I channel adder and Q channel adder, respectively, and outputting baseband signals.

The UWB transceiver may further comprise: a decoder decoding baseband data stream data; a modulator modulating the signal out from the decoder; and a baseband analog converting the signals out from the modulator to a baseband analog signal and transmitting the converted baseband analog signals to the I channel transmission mixer and the Q channel transmission mixer.

The baseband analog may comprise: a digital-to-analog converter (DAC) converting the signals out from the modulator to signals having an analog pattern; a low pass filter (LPF) outputting signals obtained by filtering signals having predetermined bands from the signals output from the DAC; and an amplifier amplifying levels of the signals output from the LPF up to a predetermined level and outputting the amplified signals.

The UWB transceiver may further comprise a receiver baseband analog generating digital reception signals by processing the signals output from the I channel quadrature mixer and the Q channel quadrature mixer.

The receiver baseband analog may comprise: a LPF outputting signals obtained by filtering signals having predetermined bands from the signals output from the I channel quadrature mixer and the Q channel quadrature mixer; an amplifier amplifying levels of the signals output from the LPF up to a predetermined level and outputting the amplified signals; an integrator accumulating the signals output from the amplifier for a time interval determined by a reset signal; and an analog-to-digital converter (ADC) converting the signal output from the integrator to a digital signal and outputting the converted digital signal.

According to another aspect of the present invention, there is provided an ultra-wideband (UWB) transceiver comprising: a clock generator generating a clock signal; a variable time delayer receiving the clock signal output from the clock generator and outputting time-delayed signals delayed by integer times a predetermined time; a gating logic generating signals for informing of generation times of pulses to be made in response to the time-delayed signals output from the variable time delayer; an envelope generator generating a plurality of envelope signals corresponding to the signals generated by the gating logic; a phase modulator receiving a baseband transmission data signal, the signals output from the gating logic, and the envelope signals generated by the envelope generator and outputting phase modulated envelope waveforms to correspond to logic values of the baseband transmission data signal; a local oscillator array composed of at least two oscillators outputting oscillation signals of sinusoidal waves having predetermined frequencies; a multiplier array receiving the envelope waveforms output from the phase modulator and the oscillation signals output from the local oscillator array; an I channel adder and a Q channel adder outputting an I channel pulse signal and a Q channel pulse signal by adding output signals having the same phase components among the signals output from the multiplier array, respectively; a transmission line encoding and modulating the baseband transmission data signal and transmitting the encoded and modulated baseband transmission data signal to the phase modulator; and an I channel quadrature mixer and a Q channel quadrature mixer receiving a reception signal received via an antenna and the pulse signals output from the I channel adder and Q channel adder, respectively, and outputting baseband signals.

The variable time delayer may comprise: a phase lag loop outputting a plurality of signals delayed by integer times the clock signal output from the clock generator; and a clock multiplexer selecting some of the signals output from the phase lag loop.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will now be described more fully with reference to the accompanying drawings, in which embodiments of the invention are shown.

Figure 1:
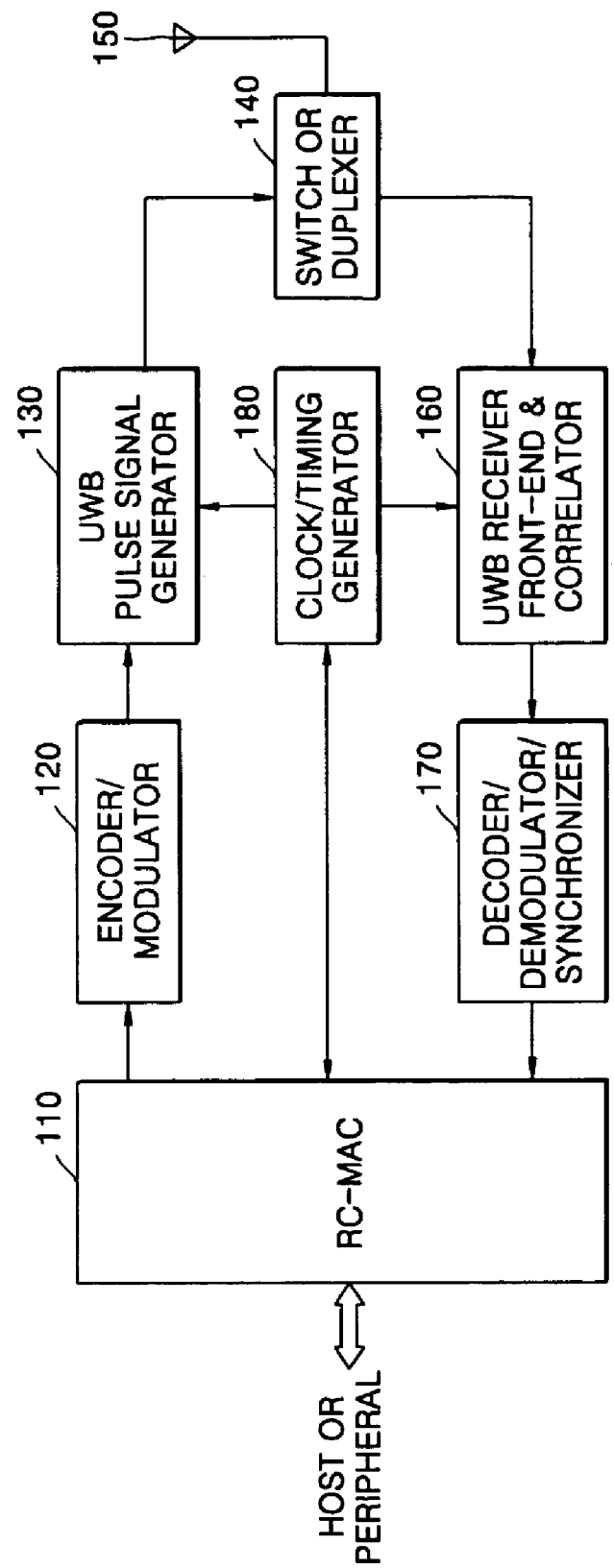
FIG. 1 is a block diagram of a conventional UWB transceiver.
Figure 2:
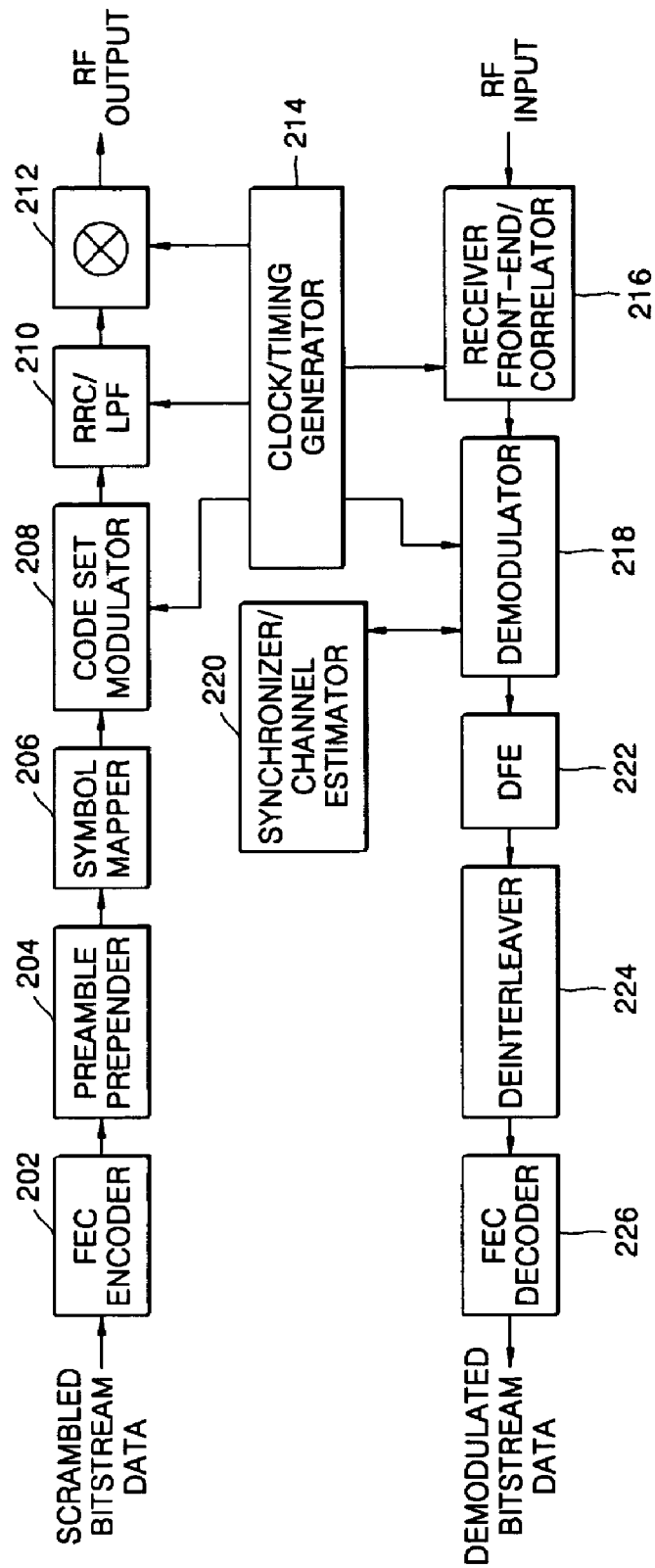
FIG. 2 is a block diagram of a conventional UWB transceiver adopting a DS-CDMA method.
Figure 3:
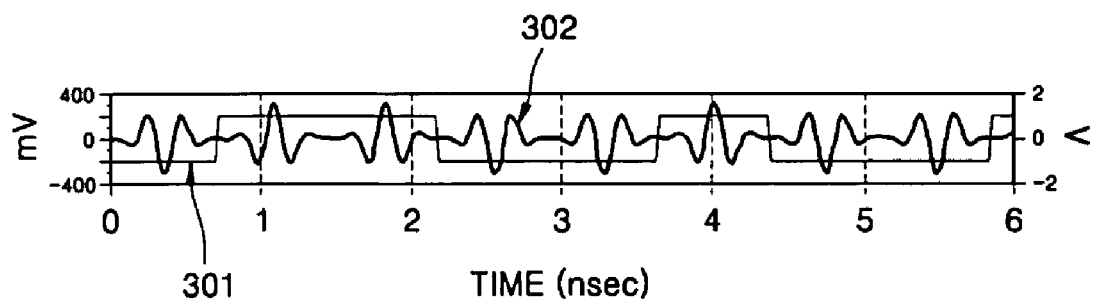
FIG. 3 is a waveform diagram illustrating a UWB impulse signal generated by the UWB transceiver of FIG. 2.
Figure 4:
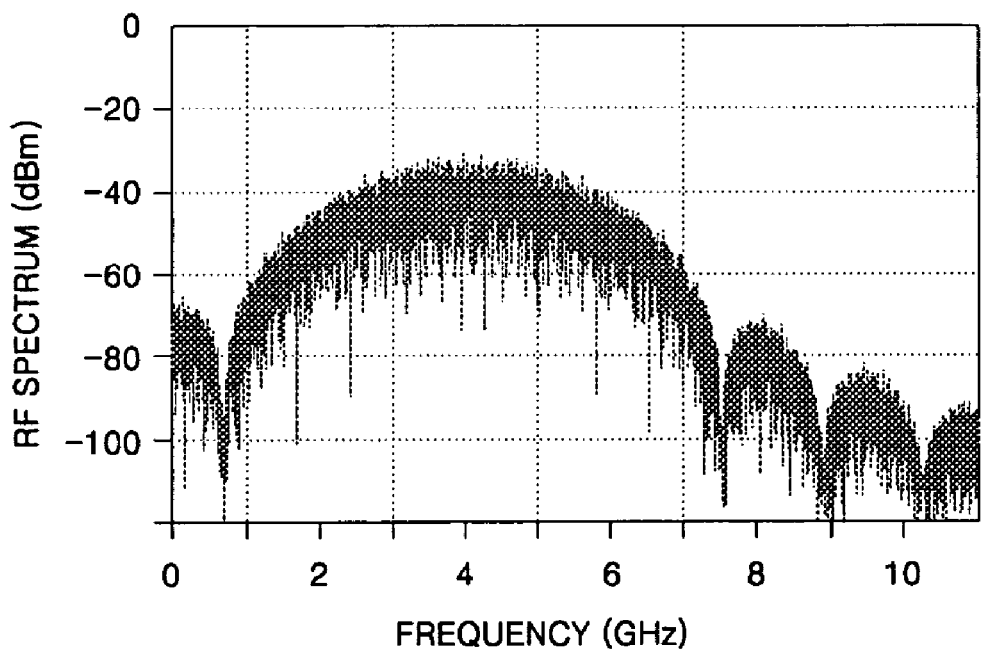
FIG. 4 illustrates a power spectrum of the UWB impulse signal of FIG. 3.
Figure 5:
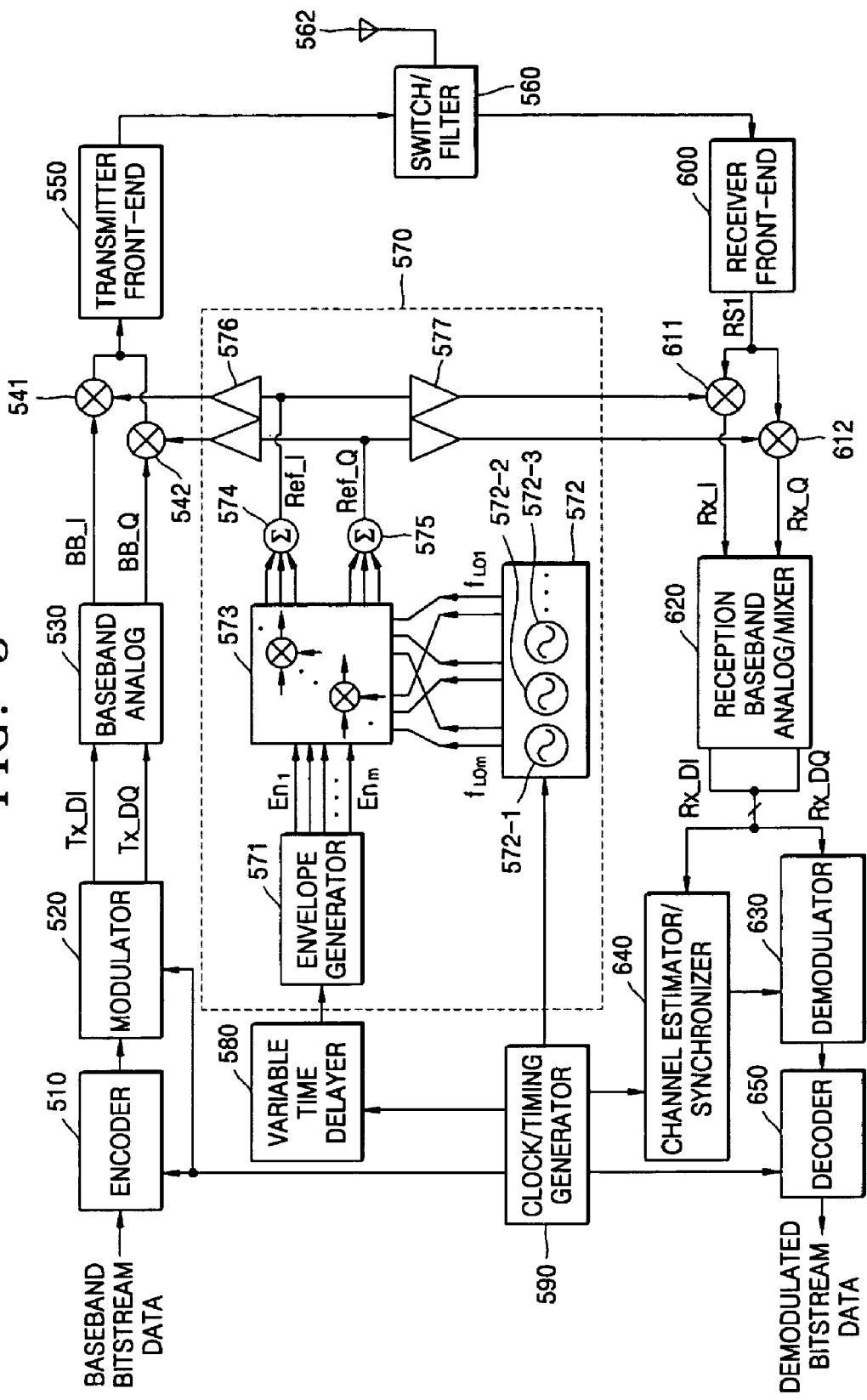
FIG. 5 is a block diagram of a pulse signal generator and a UWB transceiver including the pulse signal generator according to an embodiment of the present invention.
Figure 6:
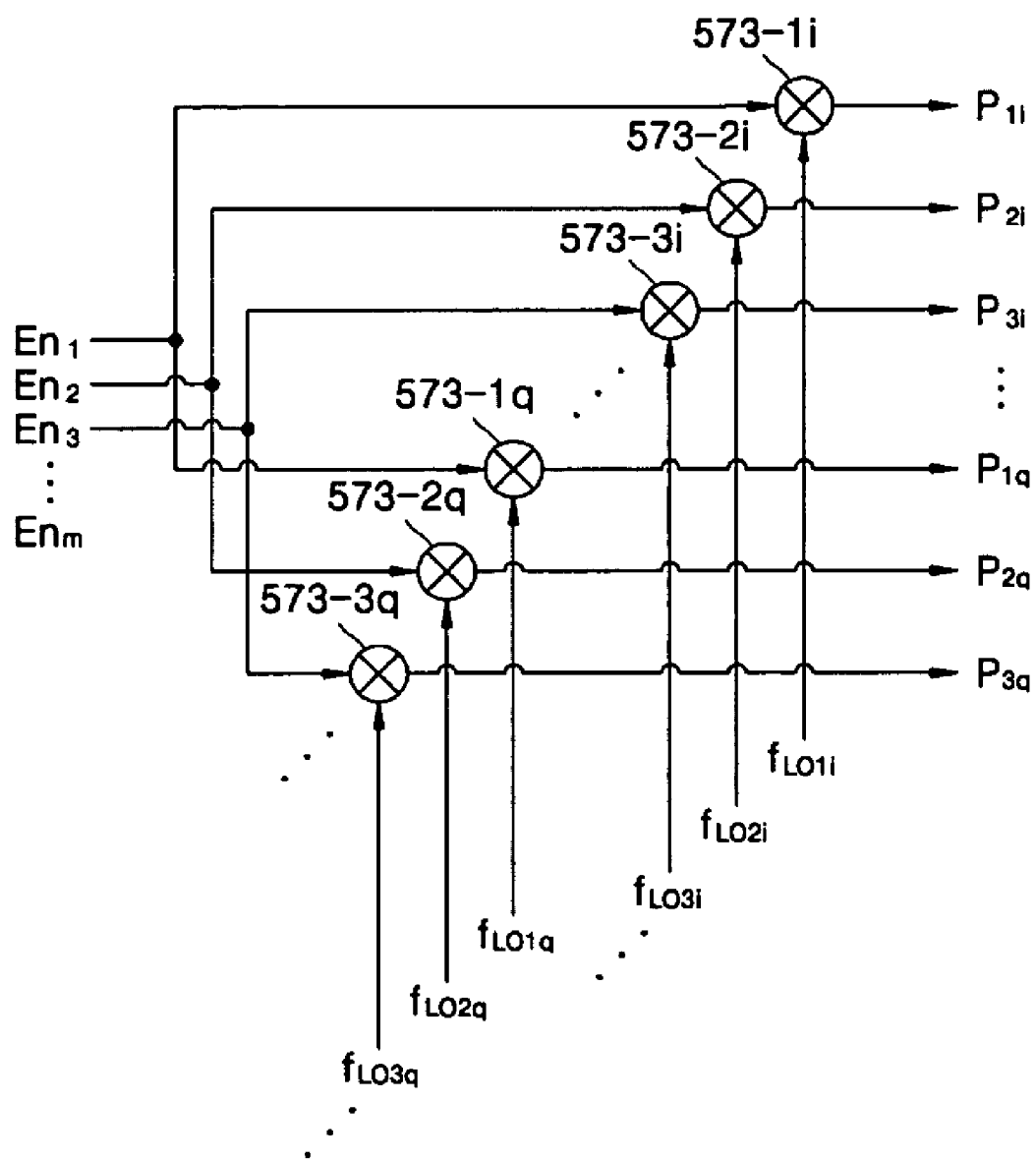
FIG. 6 is an embodiment of a multiplier array included in the pulse signal generator of FIG. 5.
Figure 7:
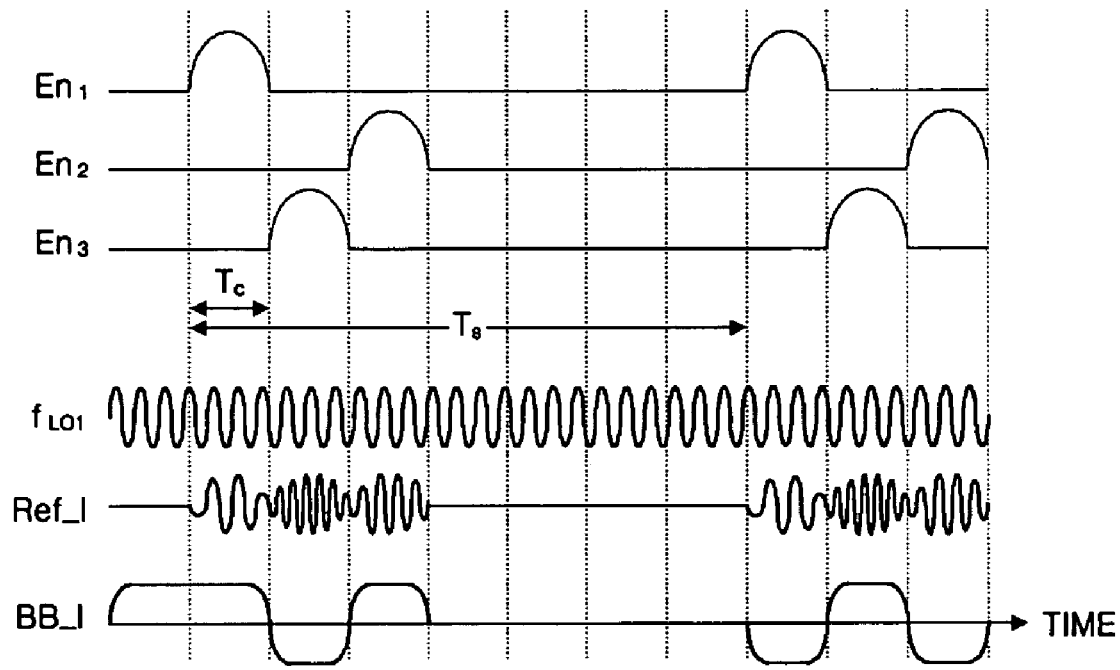
FIG. 7 is a waveform diagram illustrating signal waveforms generated inside the pulse signal generator of FIG. 5.
Figure 8:
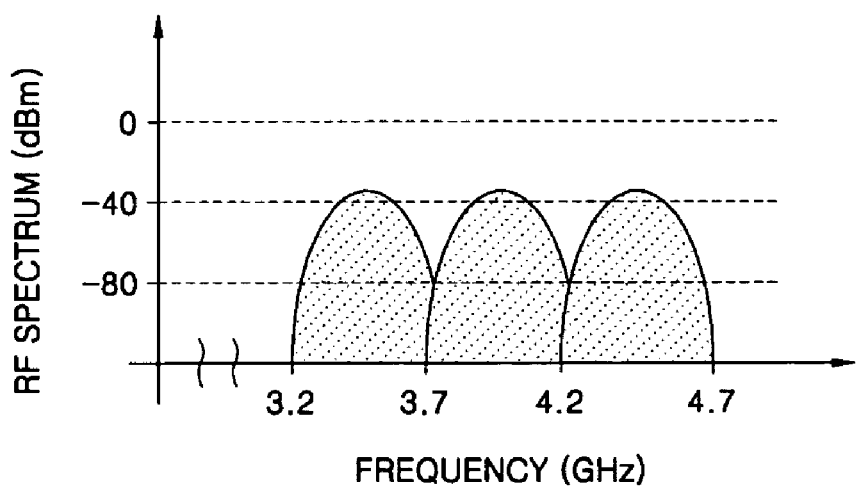
FIG. 8 illustrates a power spectrum of an output signal among the signals illustrated in FIG. 7.

FIG. 5 is a block diagram of a pulse signal generator 570 and a UWB transceiver including the pulse signal generator according to an embodiment of the present invention. FIG. 6 is an embodiment of a multiplier array included in the pulse signal generator 570 of FIG. 5. FIG. 7 is a waveform diagram illustrating signal waveforms generated inside the pulse signal generator 570 of FIG. 5. FIG. 8 illustrates a power spectrum of an output signal among the signals illustrated in FIG. 7.

Referring to FIG. 5, the pulse signal generator 570 includes an envelope generator 571, which generates at least one waveforms having a predetermined pattern in a predetermined time period, a local oscillator array 572, which includes a plurality of oscillators and generates oscillation signals having independent frequencies, a multiplier array 573, which outputs signals obtained by multiplying the waveforms generated by the envelope generator 571 by the oscillation signals generated by the local oscillator array 572.

In detail, the envelope generator 571 generates a plurality of envelope signals, e.g., m envelope signals, and each envelope signal can include a plurality of waveforms having a relatively wide pulse width of 1 ns. The number of envelope signals output from the envelope generator 571 is the same as the number of using bands. For example, when 3 frequency bands are used, the envelope generator 571 generates three envelope signals $E_{n_1}$, $E_{n_2}$, and $E_{n_3}$ as shown in FIG. 7. Each of the envelope signals $E_{n_1}$, $E_{n_2}$, and $E_{n_3}$ can have an envelope waveform having a predetermined time period $T_S$ and a predetermined width $T_C$. The time period $T_S$ indicates one chip signal in a multi-band pulse mode, a time period of one symbol in an OFDM mode, or a repeating period of a frequency hopping sequence, and the width $T_C$ indicates a duration time of the chip signal or the symbol. The envelope waveform can be determined in various patterns, such as a square wave, according to required patterns of a transmission spectrum. However, in order to reduce spurious emission to adjacent side-bands, it is preferable that a trigonometric function wave, e.g., a rectified cosine wave, or a Gaussian wave is used as the envelope waveform. An example of the envelope waveform is represented by Equation 1.

$$En_k(t) = \sum_i En_{k,0}(t - iT_S) \qquad \text{[Equation 1]}$$

Here, $En_{k,0}(t)$ denotes a basic envelope waveform in one time period of an envelope signal repeating with the predetermined time period $T_S$ in a time domain.

In the envelope generator 571 generating m envelope signals, all of the envelope signals do not have to have the envelope waveform. That is, when the transceiver uses a single band DS-CDMA method, only one carrier frequency is required. Accordingly, only one envelope signal needs to have the envelope waveform, and the remaining envelope signals do not have to have the envelope waveform. Therefore, magnitudes of the remaining envelope signals having no envelope waveform are 0 in an entire time domain. When the transceiver uses a multi-band FH-OFDM method or a multi-band pulse method, envelope signals corresponding to the number of frequency bands have the envelope waveforms, and various pulse signals can be generated according to time periods and patterns of the envelope waveforms.

The local oscillator array 572 generates carrier frequency signals $f_{LO1}, \ldots, f_{LOm}$ of subbands used in the multi-band method. One carrier frequency signal $f_{LO1}$ of the carrier frequency signals $f_{LO1}, \ldots, f_{LOm}$ is shown in FIG. 7 as an example. Each of oscillators 572-1, 572-2, 572-3, generating the carrier frequency signals $f_{LO1}, \ldots, f_{LOm}$ generates an I signal and a Q signal, each having a 90° phase difference from each other. In order to generate I signals and Q signals having 90° phase differences from each other, the local oscillator array 572 can be configured with a structure in which a plurality of voltage control oscillators 572-1, 572-2, 572-3, . . . are simply arrayed or a structure of a frequency synthesizer array, in which each voltage control oscillator is connected to a PLL, that enables a more stable and correct control. In the structure in which each oscillator is connected to a PLL, the PLL includes a frequency divider, a phase-frequency detector (PFD), a charge pump, and a loop filter. Accordingly, the PLL can output very constant and stable frequency signals according to a reference signal generated by a clock/timing generator 590 existing outside the pulse signal generator 570.

The multiplier array 573 inputs a plurality of envelope signals $E_{n_1}, E_{n_2}, E_{n_3}, \ldots, E_{n_m}$ generated by the envelope generator 571 and simultaneously inputs a plurality of carrier frequency signals $f_{LO1}, \ldots, f_{LOm}$ generated by the local oscillator array 572. The input envelope signals $E_{n_1}, E_{n_2}, E_{n_3}, \ldots, E_{n_m}$ are multiplied by the input carrier frequency signals $f_{LO1}, \ldots, f_{LOm}$, respectively, in the multiplier array 573, and the multiplying results are output. The I channel multipliers 573-1$i$, 573-2$i$, 573-3$i$, . . . and Q channel multipliers 573-1$q$, 573-2$q$, 573-3$q$, . . . process I local oscillation signals and Q local oscillation signals, which have 90° phase differences from each other, respectively. Therefore, the number of multipliers is two times the number of subbands used in the multi-band method. Each of the multipliers can be, for example, an analog mixer such as a Gilbert mixer.

The envelope signals $E_{n_1}, E_{n_2}, E_{n_3}, \ldots, E_{n_m}$ generated by the envelope generator 571 are simultaneously input to the I channel multipliers 573-1$i$, 573-2$i$, 573-3$i$, . . . and Q channel multipliers 573-1$q$, 573-2$q$, 573-3$q$, . . . , respectively. That is, a first envelope signal $E_{n_1}$ is input to a first I channel multiplier 573-1$i$ and a first Q channel multiplier 573-1$q$. Likewise, a second envelope signal $E_{n_2}$ is input to a second I channel multiplier 573-2$i$ and a second Q channel multiplier 573-2$q$, and the remaining envelope signals $E_{n_3}, \ldots, E_{n_m}$ also are input in the same way. I channel frequency signals $f_{LO1i}, f_{LO2i}, f_{LO3i}, \ldots$ generated by the local oscillator array 572 are input to the I channel multipliers 573-1$i$, 573-2$i$, 573-3$i$, . . . , respectively, and Q channel frequency signals $f_{LO1q}, f_{LO2q}, f_{LO3q}, \ldots$ generated by the local oscillator array 572 are input to the Q channel multipliers 573-1$q$, 573-2$q$, 573-3$q$, . . . , respectively. That is, a first I channel frequency signal $f_{LO1i}$ is input to the first I channel multiplier 573-1$i$, and a first Q channel frequency signal $f_{LO1q}$ is input to the first Q channel multiplier 573-1$q$. Likewise, a second I channel frequency signal $f_{LO2i}$ is input to the second I channel multiplier 573-2$i$, and a second Q channel frequency signal $f_{LO2q}$ is input to the second Q channel multiplier 573-2$q$.

Therefore, the first I channel multiplier 573-1$i$ inputs the first envelope signal $E_{n_1}$ from the envelope generator 571 and the first I channel frequency signal $f_{LO1i}$ from the local oscillator array 572 and generates a first I channel pulse signal $P_{1i}$.

The first Q channel multipliers 573-1$q$ inputs the first envelope signal $E_{n_1}$ from the envelope generator 571 and the first Q channel frequency signal $f_{LO1q}$ from the local oscillator array 572 and generates a first Q channel pulse signal $P_{1q}$. Likewise, the second I channel multiplier 573-2$i$ inputs the second envelope signal $E_{n_2}$ from the envelope generator 571 and the second I channel frequency signal $f_{LO2i}$ from the local oscillator array 572 and generates a second I channel pulse signal $P_{2i}$, and the second Q channel multipliers 573-2$q$ inputs the second envelope signal $E_{n_2}$ from the envelope generator 571 and the second Q channel frequency signal $f_{LO2q}$ from the local oscillator array 572 and generates a second Q channel pulse signal $P_{2q}$.

The generated I channel pulse signals $P_{1i}, P_{2i}, P_{3i}, \ldots$ are input to an I channel adder 574, and the generated Q channel pulse signals $P_{1q}, P_{2q}, P_{3q}, \ldots$ are input to a Q channel adder 575. The I channel adder 574 generates an I channel reference pulse signal Ref_I by adding all of the input I channel pulse signals $P_{1i}, P_{2i}, P_{3i}, \ldots$, and the Q channel adder 575 generates a Q channel reference pulse signal Ref_Q by adding all of the input Q channel pulse signals $P_{1q}, P_{2q}, P_{3q}, \ldots$. The I channel reference pulse signal Ref_I is shown in FIG. 7 as an example. According to the I channel reference pulse signal Ref_I shown in FIG. 7, three frequency signals having independent frequencies correspond to three envelope waveforms existing at different locations, respectively. That is, as shown in FIG. 8, there is generated the I channel reference pulse signal Ref_I including: a first frequency signal, i.e., an around 3.2-3.7 GHz frequency signal, appearing during timing throughout an envelope waveform of the first envelope signal $E_{n_1}$ exists; a second frequency signal, i.e., an around 4.2-4.7 GHz frequency signal, appearing during timing throughout an envelope waveform of the second envelope signal $E_{n_2}$ exists; and a third frequency signal, i.e., an around 3.7-4.2 GHz frequency signal, appearing during timing throughout an envelope waveform of the third envelope signal $E_{n_3}$ exists. Since the same way is applied to the Q channel reference pulse signal Ref_Q, overlapped description is omitted.

The generated I channel reference pulse signal Ref_I and Q channel reference pulse signal Ref_Q are transmitted to both of a transmission line and a reception line via a first buffer 576 and a second buffer 577. The first buffer 576 and the second buffer 577 prevent signals of the transmission line from leaking to the reception line without going to an antenna 562, i.e., spurious components. In particular, the first buffer 576 for transmission amplifies the I channel reference pulse signal Ref_I output from the I channel adder 574 and the Q channel reference pulse signal Ref_Q output from the Q channel adder 575 to a proper power level to be processed by transmission mixers 541 and 542 in the transmission or maintains magnitudes of forward signals. The first buffer 576 also suppresses signal leakage from the transmission line to the reception line by maintaining a backward gain very low.

The I channel reference pulse signal Ref_I and Q channel reference pulse signal Ref_Q processed as described above are denoted by Equation 2 and Equation 3, respectively.

$$\text{Ref\_I} = \sum_k (En_k(t) \cdot f_{LOI_k}(t)) \quad \text{[Equation 2]}$$

$$\text{Ref\_Q} = \sum_k (En_k(t) \cdot f_{LOQ_k}(t)) \quad \text{[Equation 3]}$$

The UWB transceiver including the pulse signal generator will now be described in detail.

The transmitter is configured with a structure in which an encoder 510, a modulator 520, a baseband analog 530, the mixers 541 and 542, and a transmitter front-end 550 are sequentially deployed. The transmitter front-end 550 is connected to the antenna 562 via a switch/filter 560. The reception line is configured by including a receiver front-end 600, first and second quadrature mixers 611 and 612, a receiver baseband analog/mixer 620, a demodulator 630, a channel estimator/synchronizer 640, and a decoder 650. Besides, the UWB transceiver further includes a variable time delayer 580 and a clock/timing generator 590.

Signal processing procedures in the transmitter will now be described in detail. Scrambled baseband bitstream data is encoded by the encoder 510. The encoded signal is modulated by the modulator 520 and output as digital signals Tx_DI and Tx_DQ divided into an I channel and a Q channel. The digital signals Tx_DI and Tx_DQ divided into the I channel and the Q channel are input to the baseband analog 530. The baseband analog 530 outputs baseband data signals BB_I and BB_Q by processing the input digital signals Tx_DI and Tx_DQ.

Figure 9:
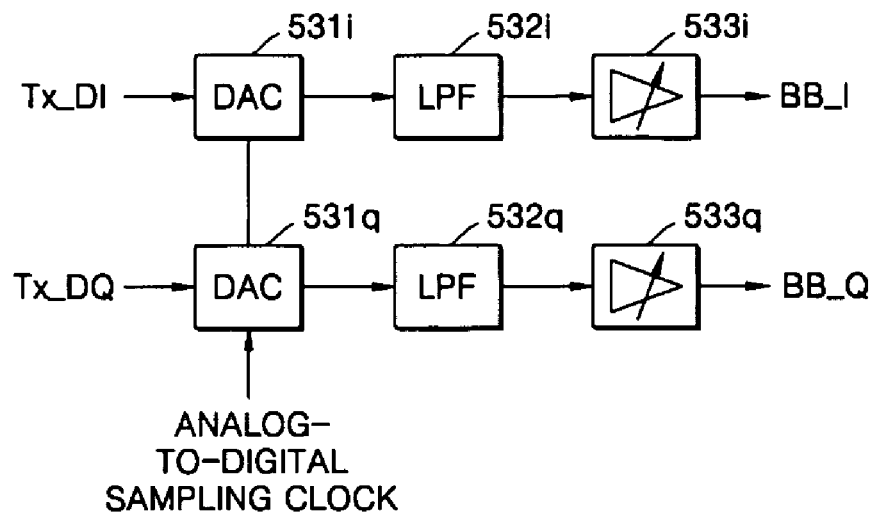
FIG. 9 is a block diagram of an embodiment of a baseband analog included in the UWB transceiver of FIG. 5.

An example configuration of the baseband analog 530 is shown in FIG. 9. Referring to FIG. 9, the baseband analog 530 can be configured by sequentially deploying DACs 531$i$ and 531$q$, LPFs 532$i$ and 532$q$, and amplifiers 533$i$ and 533$q$. That is the digital signals Tx_DI and Tx_DQ divided into an I channel and a Q channel by the modulator 520 are converted to baseband analog signals by the DACs 531$i$ and 531$q$ for the I channel and the Q channel, respectively, spurious signals and harmonic components of the baseband analog signals are filtered by the LPFs 532$i$ and 532$q$, and output signal levels are maintained to a predetermined level by the amplifiers 533$i$ and 533$q$. A variable gain amplifier can be used as the amplifiers 533$i$ and 533$q$. The I channel baseband data signal BB_I of the baseband data signals BB_I and BB_Q output from the baseband analog 530 is shown in FIG. 7 as an example. As shown in FIG. 7, transition timing of the I channel baseband data signal BB_I is actually matched to transition timing of the I channel reference pulse signal Ref_I.

The baseband data signals BB_I and BB_Q output from the baseband analog 530 are input to the transmission mixers 541 and 542, respectively. That is, the I channel baseband data signal BB_I is input to the I channel mixer 541, and the Q channel baseband data signal BB_Q is input to the Q channel mixer 542. The I channel reference pulse signal Ref_I generated by the pulse signal generator 570 is also input to the I channel transmission mixer 541. Likewise, the Q channel reference pulse signal Ref_Q generated by the pulse signal generator 570 is also input to the Q channel transmission mixer 542. The I channel transmission mixer 541 outputs a signal obtained by multiplying the input I channel baseband data signal BB_I by the input I channel reference pulse signal Ref_I to the transmitter front-end 550. The Q channel transmission mixer 542 outputs a signal obtained by multiplying the input Q channel baseband data signal BB_Q by the input Q channel reference pulse signal Ref_Q to the transmitter front-end 550. The transmitter front-end 550 transmits the signals output from the transmission mixers 541 and 542 to the antenna 562 via the switch/filter 560.

In the procedures described above, the clock/timing generator 590 generates a clock signal and outputs the clock signal to the encoder 510 and modulator 520 in the transmission line and the channel estimator/synchronizer 640 and decoder 650 in the reception line. The encoder 510 and modulator 520 in the transmission line and the channel estimator/synchronizer 640 and decoder 650 in the reception line operate by synchronized with the input clock signal. Besides, the clock/timing generator 590 outputs a binary signal having a predetermined time period to the variable time delayer 580.

The variable time delayer 580 generates a waveform obtained by delaying the binary signal input by a command of a radio controller (not shown) by a predetermined time and outputs the generated waveform to the envelope generator 571 included in the pulse signal generator 570. Commonly, synchronization is not achieved in an initial receiver status, and accordingly, a sync acquisition mode must be performed in a subsequent procedure. To acquire the sync, it must be delayed that the I channel reference pulse signal Ref_I and the Q channel reference pulse signal Ref_Q are input to the first and second quadrature mixers 611 and 612 until a maximum correlation value is obtained. That is, beginning times of two input signals in a time domain, i.e., a received UWB signal and each of the reference pulse signals Ref_I and Ref_Q generated by the pulse signal generator 570, must be matched. To match the beginning times, the reference pulse signals Ref_I and Ref_Q generated by the pulse signal generator 570 are necessarily delayed to match with the received UWB signal including a path delay effect and a circuit delay effect. The variable time delayer 580 performs the time delay function. The variable time delayer 580 can be realized using a delay locked loop (DLL), which is little affected by fluctuation of a voltage source or chip internal switching noise and provides an exact time delay value, and a clock multiplexer, which selects some of signals output from the DLL.

Signal processing procedures in the reception line will now be described in detail. The receiver front-end 600 is activated when the UWB transceiver is in a reception status and includes a low noise amplifier amplifying a received signal and a gain controller controlling a gain of the low noise amplifier. Therefore, a signal received via the antenna 562 is input to the first and second quadrature mixers 611 and 612 via the switch/filter 560 and the receiver front-end 600. An I channel signal of the signal output from the receiver front-end 600 is input to the first quadrature mixer 611, and a Q channel signal of the signal output from the receiver front-end 600 is input to the second quadrature mixer 612. Besides the I channel signal input from the receiver front-end 600, the I channel reference pulse signal Ref_I generated by the pulse signal generator 570 is also input to the first quadrature mixer 611. Also, besides the Q channel signal input from the receiver front-end 600, the Q channel reference pulse signal Ref_Q generated by the pulse signal generator 570 is input to the second quadrature mixer 612. The first quadrature mixer 611 generates an I channel reception signal Rx_I by multiplying the input I channel signal by the input I channel reference pulse signal Ref_I, and the second quadrature mixer 612 generates a Q channel reception signal Rx_Q by multiplying the input Q channel signal by the input Q channel reference pulse signal Ref_Q. The generated I channel reception signal Rx_I and a Q channel reception signal Rx_Q are converted to an I channel digital reception signal Rx_DI and a Q channel digital reception signal Rx_DQ by the receiver baseband analog/mixer 620, respectively.

Figure 10:
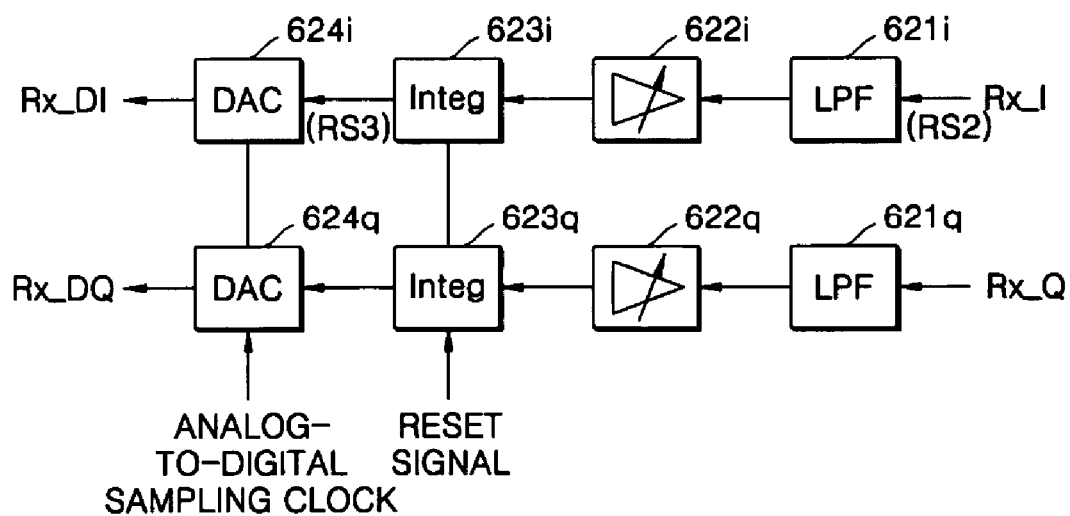
FIG. 10 is a block diagram of an embodiment of a receiver baseband analog/mixer included in the UWB transceiver of FIG. 5.

An example of a configuration of the receiver baseband analog/mixer 620 is shown in FIG. 10. Referring to FIG. 10, the receiver baseband analog/mixer 620 can be configured by sequentially deploying LPFs 621$i$ and 621$q$, amplifiers 622$i$ and 622$q$, integrators 623$i$ and 623$q$, ADCs 624$i$ and 624$q$. That is, high frequency components of the I channel reception signal Rx_I Q channel reception signal Rx_Q generated by the first quadrature mixer 611 and second quadrature mixer 612 are removed by the LPFs 621$i$ and 621$q$, respectively. Amplitudes of the signals output from the LPFs 621$i$ and 621*q* are amplified or diminished to a predetermined level by the amplifiers 622*i* and 622*q*, respectively. The signals output from the amplifiers 622*i* and 622*q* are integrated during a predetermined duration and processed by the integrators 623*i* and 623*q*, respectively. The signals output from the integrators 623*i* and 623*q* are converted to digital signals and output as an I channel digital reception signal Rx_DI and a Q channel digital reception signal Rx_DQ by the ADCs 624*i* and 624*q*, respectively. When the integrators 623*i* and 623*q* integrate input signals, an integrating duration is determined by a reset signal. The analog-to-digital conversion performed by the ADCs 624*i* and 624*q* is performed by being synchronized with an analog-to-digital sampling clock.

Figure 11:
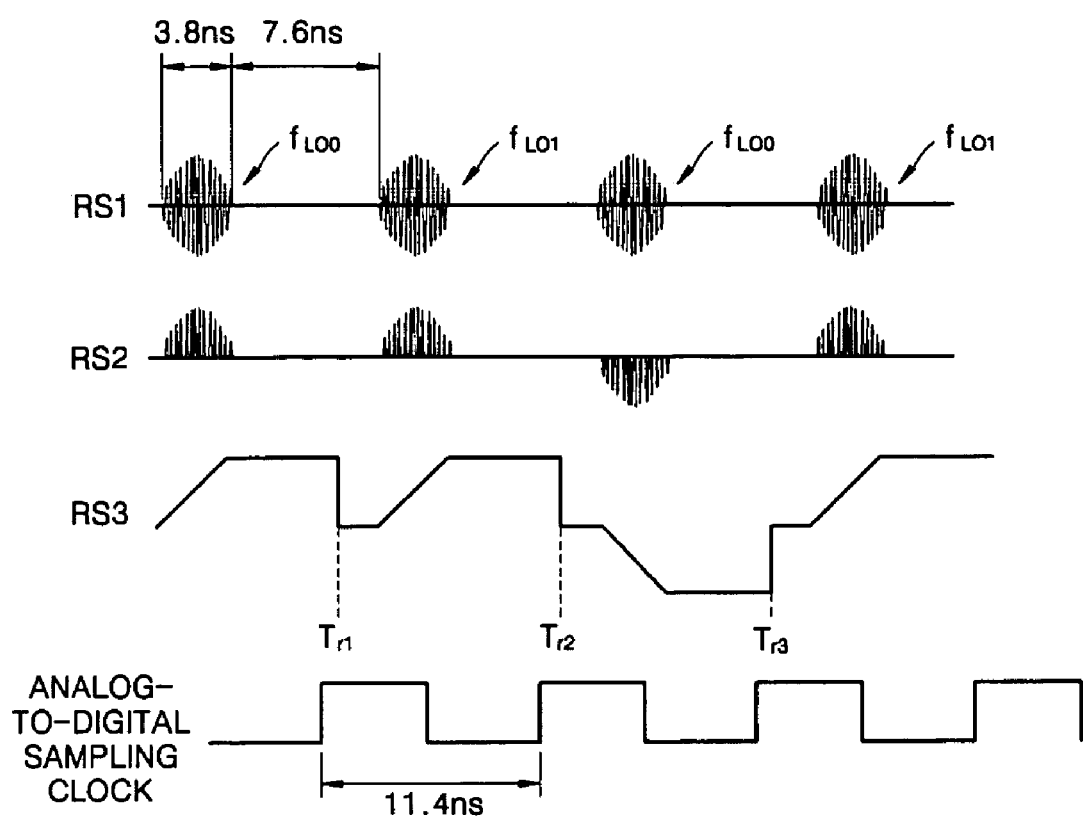
FIG. 11 is a waveform diagram illustrating signal waveforms in a reception line of the UWB transceiver of FIG. 5.

FIG. 11 is a waveform diagram illustrating signal waveforms in the reception line of the UWB transceiver of FIG. 5. In FIG. 11, a case where the UWB transceiver operates in the multi-band pulse mode in which only two bands are used is illustrated as an example, and the same description is also applied to cases where more than three bands are used.

Referring to FIG. 11, in a tracking mode of restoring data after synchronization is finished, a received signal RS1 obtained by passing through the antenna 562, the switch/filter 560, and the receiver front-end 600 has alternative frequency waveforms $f_{LO0}$ and $f_{LO1}$. Widths of the frequency waveforms $f_{LO0}$ and $f_{LO1}$ are, for example, 3.8 ns, and each interval between the frequency waveforms $f_{LO0}$ and $f_{LO1}$ is, for example, 7.6 ns. When the received signal RS1 passes through the quadrature mixers 611 and 612 and the LPFs 621*i* and 621*q*, a baseband signal RS2 is generated by removing a carrier signal from the received signal RS1. The baseband signal RS2 is input to the integrators 623*i* and 623*q*, and a signal RS3 output from the integrators 623*i* and 623*q* maintains a constant value when pulses of the baseband signal RS2 do not exist and becomes 0 by reset signals $T_{r1}$, $T_{r2}$, $T_{r3}$ input just before next pulses are input. The signal RS3 output from the integrators 623*i* and 623*q* is converted to a digital signal by the ADCs 624*i* and 624*q*. At this time, the analog-to-digital sampling clock is controlled to be input to the ADCs 624*i* and 624*q* just before the reset signals $T_{r1}$, $T_{r2}$, $T_{r3}$ are input to the integrators 623*i* and 623*q*. The I channel digital reception signal Rx_DI and the Q channel digital reception signal Rx_DQ generated by the procedures described above are demodulated by the demodulator 630 and decoded by the decoder 650, and then demodulated bitstream data is generated.

Figure 12:
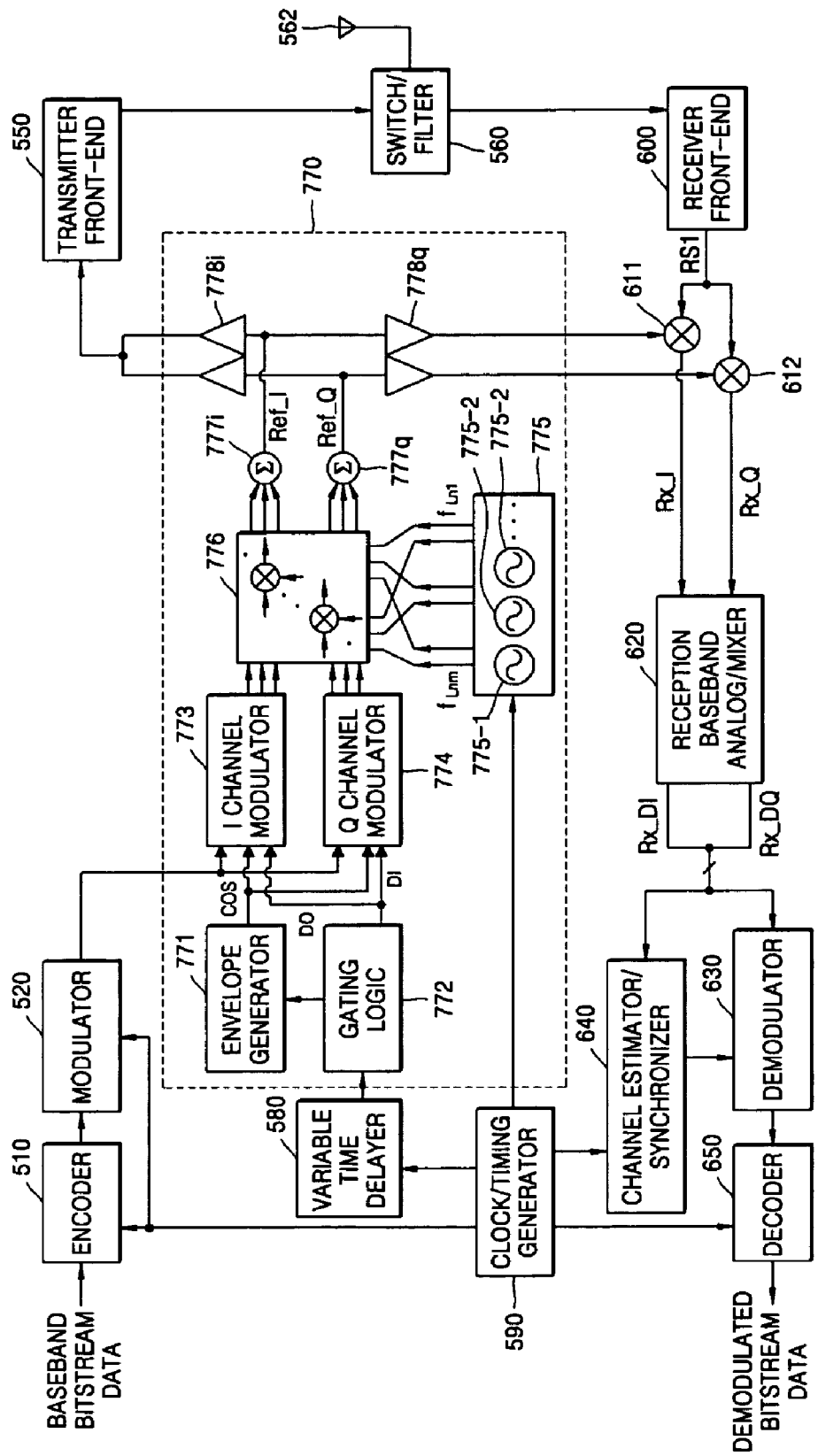
FIG. 12 is a block diagram of a pulse signal generator and a UWB transceiver including a pulse signal generator according to another embodiment of the present invention.

FIG. 12 is a block diagram of a pulse signal generator and a UWB transceiver including a pulse signal generator 770 according to another embodiment of the present invention. In FIG. 12, the same reference numbers with FIG. 5 denote the same elements.

Referring to FIG. 12, the pulse signal generator 770 is different from the pulse signal generator 570 described with reference to FIG. 5 in terms of a modulation function performed inside. In detail, the pulse signal generator 770 includes a consecutive envelope generator 771, a gating logic 772, an I channel phase modulator 773, a Q channel phase modulator 774, a quadrature frequency synthesizer 775, a multiplier array 776, an I channel adder 777*i*, a Q channel adder 777*q*, an I channel buffer 778*i*, and a Q channel buffer 778*q*.

Figure 14:
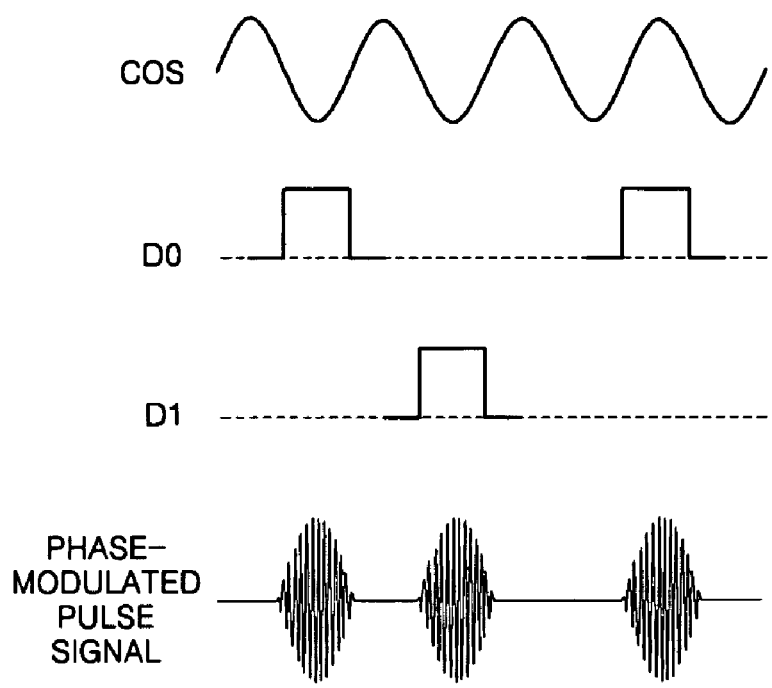
FIG. 14 is a waveform diagram illustrating signal waveforms input to the phase modulator circuit of FIG. 13.

The consecutive envelope generator 771 generates a periodic and consecutive envelope signal. For example, the consecutive envelope generator 771 generates a trigonometric function having relatively long time period of more than several nano seconds, particularly a cosine wave COS, as shown in FIG. 14. The gating logic 772 receives binary signals delayed by predetermined times by the variable time delayer 580 and selects a specific binary signal of the binary signals and outputs the selected binary signal. The gating logic 772 determines a band, which must be selected at a certain time, and on-off times of pulses in the multi-band pulse method and determines only the on-off times of pulses in a single band pulse method. For example, as shown in FIG. 14, in the multi-band pulse method using two bands, the gating logic 772 generates two pulse signals D0 and D1.

The I channel phase modulator 773 and the Q channel phase modulator 774 receive the envelope signal COS generated by the consecutive envelope generator 771, the binary signals D0 and D1 generated by the gating logic 772, and a baseband transmission data signal output from the modulator 520, respectively, and output envelope waveforms phase-modulated according to logic values of the baseband transmission data signal. Here, the baseband transmission data signal includes a binary non return-to-zero (NRZ) or ternary data signal. For example, when a logic value of the baseband transmission data signal is 1 and a frequency band to be output is a first band, a signal D0×cos($\omega_e$t) is output (here, $\omega_e$ is an angular frequency of an envelope waveform), and when the logic value of the baseband transmission data signal is 0, a signal −D0×cos($\omega_e$t) is output.

Figure 13:
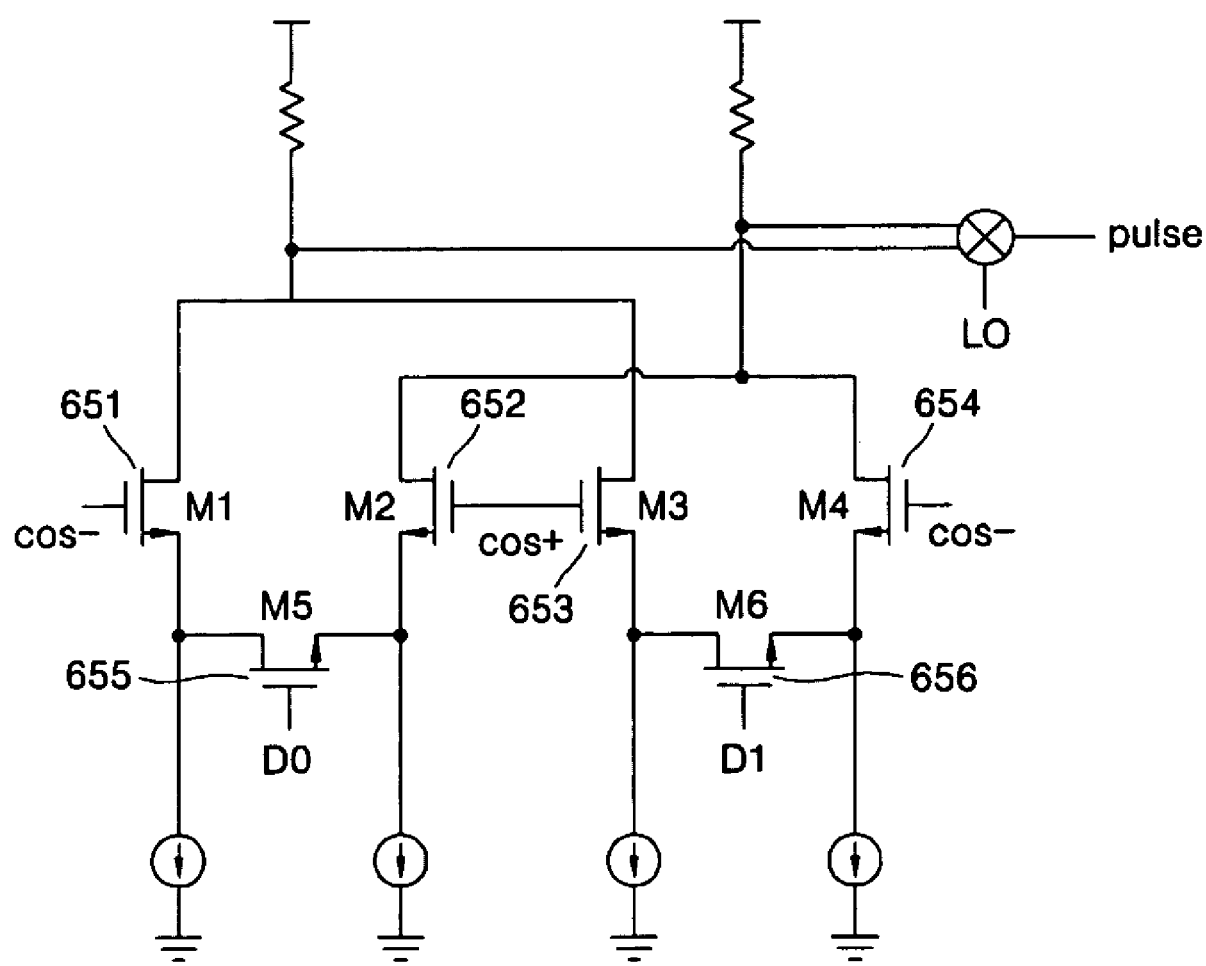
FIG. 13 is a circuit diagram an embodiment of a phase modulator circuit of the pulse signal generator of FIG. 12.

FIG. 13 is a circuit diagram of an embodiment of a phase modulator circuit of the pulse signal generator 770 of FIG. 12. The circuit diagram shown in FIG. 13 is realized to be suited to the multi-band pulse method using two bands, and can also be applied to cases where more bands are used.

Referring to FIG. 13, the binary signals D0 and D1 output from the gating logic 772 are input to the gates of NMOS transistors M5 and M6, respectively. The envelope signal COS generated by the consecutive envelope generator 771 is input to the gates of NMOS transistors M1, M2, M3, and M4 in a differential signal pattern, respectively. That is, the envelope signal COS is input to the gates of the NMOS transistors M1 and M2 configured as a differential amplifier in the differential signal pattern, respectively. Likewise, the envelope signal COS is input to the gates of the NMOS transistors M3 and M4 configured as a differential amplifier, which are located side by side with the NMOS transistors M1 and M2, in the differential signal pattern, respectively. The source of the NMOS transistor M1 and the source of the NMOS transistor M2 are connected to the drain and the source of the NMOS transistor M5, respectively. Likewise, the source of the NMOS transistor M3 and the source of the NMOS transistor M3 are connected to the drain and the source of the NMOS transistor M6, respectively.

FIG. 14 is a waveform diagram illustrating signal waveforms input to the phase modulator circuit of FIG. 13.

Referring to a phase-modulated pulse signal output from the phase modulator circuit shown in FIG. 14, when a logic value of the binary signal D0 output from the gating logic 772 is 1, a pulse signal in which a center frequency is a first frequency is output, and when a logic value of the binary signal D1 output from the gating logic 772 is 1, a pulse signal in which a center frequency is a second frequency is output. At this time, an envelope of the output pulse signal has a cosine wave pattern.

Figure 15:
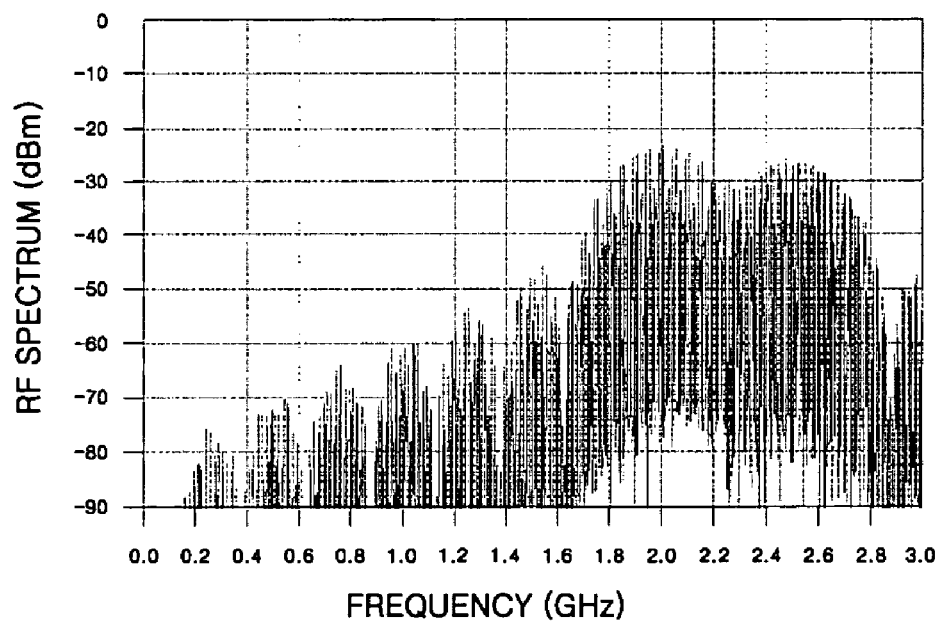
FIG. 15 illustrates a power spectrum of a phase-modulated pulse signal illustrated in FIG. 14.

FIG. 15 illustrates a power spectrum of the phase-modulated pulse signal illustrated in FIG. 14.

Referring to FIG. 15, the first frequency, which is the center frequency of the pulse signal according to the binary signal D0, is around 2 GHz, and the second frequency, which is the center frequency of the pulse signal according to the binary signal D1, is around 2.5 GHz. In the whole, the spectrum of a transmission wave shows UWB characteristics in the multi-band pulse method.

Figure 16:
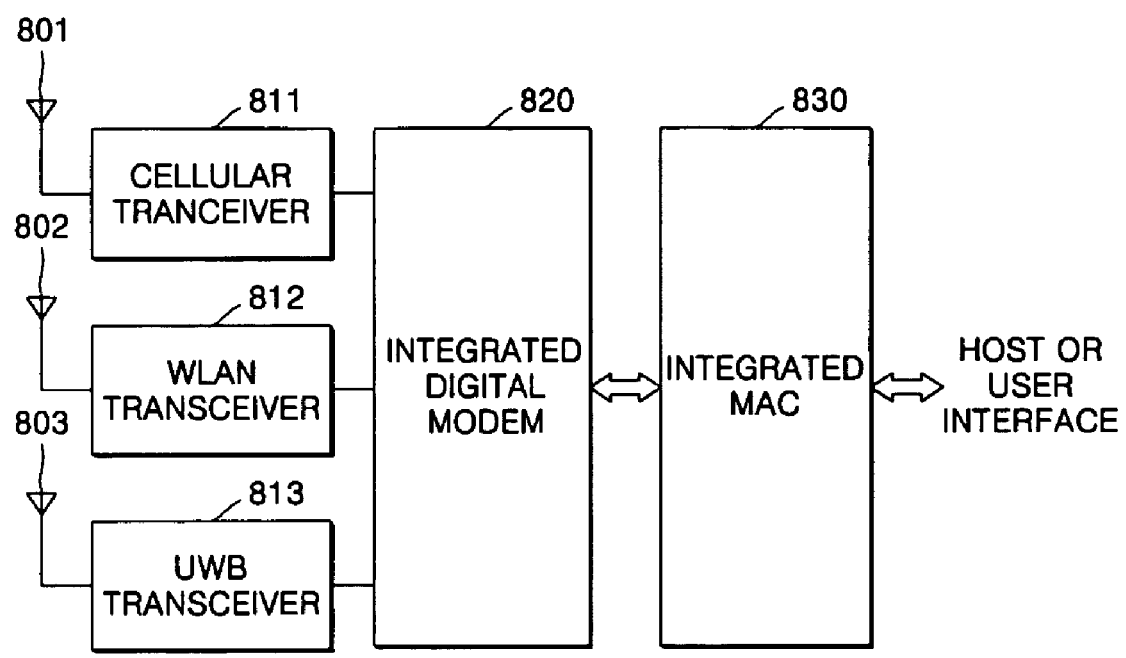
FIG. 16 is a block diagram illustrating an application of a UWB transceiver according to another embodiment of the present invention.

FIG. 16 is a block diagram illustrating an application of a UWB transceiver 813 according to another embodiment of the present invention.

Referring to FIG. 16, the UWB transceiver 813 can be connected to an antenna 803 and an integrated digital modem 820. Besides the UWB transceiver 813, other transceivers, i.e., a cellular transceiver 811 and a wireless LAN (WLAN) transceiver 812, also are connected to the integrated digital modem 820. Antennas 801 and 802 are connected to the cellular transceiver 811 and the WLAN transceiver 812, respectively. The integrated digital modem 820 connected to several transceivers including the UWB transceiver 813 can perform data communication with an integrated media access controller (MAC) 830, and the integrated MAC 830 can perform data communication with a host or a user interface.

As described above, according to embodiments of the present invention, pulse waveforms suitable for various methods, such as a single band DS-CDMA method, a multi-band pulse method, and a multi-band FH-OFDM method, can be generated by controlling a plurality of parameters, e.g., period, width, and waveform, of a pulse signal generator. Accordingly, UWB communication using various methods can be performed using one transceiver. Also, all of elements of the transceiver can be realized using low voltage CMOS or SiGe circuits. Accordingly, a highly integrated, low voltage, and low price UWB transceiver can be easily realized. Furthermore, a very fast frequency hopping characteristic having a carrier frequency transition time of below 1 ns can be obtained by using a multiplier array and a quadrature frequency synthesizer included in the pulse signal generator, performance degradation due to interference with a narrow band wireless communication system can be prevented by selectively removing certain frequency bands, and it is possible to actively cope with a regulation change of a UWB frequency.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A pulse signal generator for ultra-wideband transception comprising:
an envelope generator generating a plurality of envelope signals, wherein waveforms of the envelope signals are determined in various hopping patterns according to required patterns of a transmission spectrum;
a local oscillator array composed of a plurality of high frequency oscillators, each oscillator outputting two oscillation signals having a phase difference from each other;
a multiplier away receiving the envelope signals and the oscillation signals and outputting signals obtained by respectively multiplying the envelope signals by the oscillation signals; and
an I channel adder and a Q channel adder outputting an I channel pulse signal and a Q channel pulse signal by adding output signals having the same phase components among the signals output from the multiplier array, respectively.

2. The pulse signal generator of claim 1, wherein at least one of the envelope signals comprises at least one envelope waveform having a predetermined pattern in a predetermined time period.

3. The pulse signal generator of claim 1, wherein the number of envelope signals is the same as the number of frequency bands to be used.

4. The pulse signal generator of claim 1, wherein the multiplier away comprises multipliers, which have similar electrical characteristics, corresponding to two times the number of frequency bands to be used.

5. The pulse signal generator of claim 1, further comprising: a first buffer and a second buffer transmitting both of the I channel pulse signal output from the I channel adder and the Q channel pulse signal output from the Q channel adder to a transmission line and a reception line, respectively.

6. A pulse signal generator comprising:
a gating logic generating a signal for informing of a generation time of a pulse to be made in response to a delayed clock signal;
an envelope generator generating a plurality of envelope signals corresponding to the signal output from the gating logic; a phase modulator for receiving a baseband transmission data signal transmitted through a transmission line, the signal output from the gating logic, and the envelope signals generated by the envelope generator and outputting phase modulated envelope waveforms to correspond to logic values of the baseband transmission data signal;
a local oscillator away composed of at least two oscillators, each oscillator outputting oscillation signals of trigonometric function waves having predetermined frequencies;
a multiplier array receiving the envelope waveforms output from the phase modulator and the oscillation signals output from the local oscillator array; and an I channel adder and a Q channel adder outputting an I channel pulse signal and a Q channel pulse signal by adding output signals having the same phase components among the signals output from the multiplier array, respectively.

7. An ultra-wideband (UWB) transceiver comprising:
a clock generator generating a clock signal;
a variable time delayer receiving the clock signal output from the clock generator and outputting time-delayed signals delayed by integer times a predetermined time;
an envelope generator generating a plurality of envelope signals repeating in a predetermined time period according to the time-delayed signals output from the variable time delayer;
a local oscillator away composed of a plurality of high frequency oscillators, each oscillator outputting two oscillation signals having a 90° degree phase difference from each other;
a multiplier array receiving the envelope signals and the oscillation signals and outputting signals obtained by respectively multiplying the envelope signals by the oscillation signals;
an I channel adder and a Q channel adder outputting an I channel pulse signal and a Q channel pulse signal by adding output signals having the same phase components among the signals output from the multiplier array, respectively;
an I channel transmission mixer and a Q channel transmission mixer mixing a baseband transmission data signal and the pulse signals output from the I channel adder and Q channel adder, respectively; and an I channel quadrature mixer and a Q channel quadrature mixer receiving a reception signal received via an antenna and the pulse signals output from the I channel adder and Q channel adder, respectively, and outputting baseband signals.

8. The UWB transceiver of claim 7, further comprising:

a decoder decoding baseband data stream data;

a modulator modulating the signal out from the decoder; and a baseband analog converter converting the signals out from the modulator to a baseband analog signal and transmitting the converted baseband analog signals to the I channel transmission mixer and the Q channel transmission mixer.

9. The UWB transceiver of claim 8, wherein the baseband analog comprises:

a digital-to-analog converter (DAC) converting the signals out from the modulator to signals having an analog pattern;

a low pass filter (LPF) outputting signals obtained by filtering signals having predetermined frequency bands from the signals output from the DAC; and an amplifier amplifying levels of the signals output from the LPF up to a predetermined signal level and outputting the amplified signals.

10. The UWB transceiver of claim 7, further comprising: a receiver baseband analog generating digital reception signals by processing the signals output from the I channel quadrature mixer and the Q channel quadrature mixer.

11. The UWB transceiver of claim 10, wherein the receiver baseband analog comprises:

a LPF outputting signals obtained by filtering signals having predetermined bands from the signals output from the I channel quadrature mixer and the Q channel quadrature mixer;

an amplifier amplifying levels of the signals output from the LPF up to a predetermined signal level and outputting the amplified signals;

an integrator accumulating the signals output from the amplifier for a time interval determined by a reset signal; and an analog-to-digital converter (ADC) converting the signal output from the integrator to a digital signal and outputting the converted digital signal.

12. An ultra-wideband (UWB) transceiver comprising:

a clock generator generating a clock signal; a variable time delayer receiving the clock signal output from the clock generator and outputting time-delayed signals delayed by integer times a predetermined time;

a gating logic generating signals for informing of generation times of pulses to be made in response to the time-delayed signals output from the variable time delayer;

an envelope generator generating a plurality of envelope signals corresponding to the signals generated by the gating logic;

a phase modulator receiving a baseband transmission data signal transmitted through a transmission line, the signals output from the gating logic, and the envelope signals generated by the envelope generator and outputting phase modulated envelope waveforms to correspond to logic values of the baseband transmission data signal;

a local oscillator array composed of at least two oscillators each outputting oscillation signals of trigonometric function waves having predetermined frequencies;

a multiplier array receiving the envelope waveforms output from the phase modulator and the oscillation signals output from the local oscillator array;

an I channel adder and a Q channel adder outputting an I channel pulse signal and a Q channel pulse signal by adding output signals having the same phase components among the signals output from the multiplier array, respectively;

a transmission line encoding and modulating the baseband transmission data signal and transmitting the encoded and modulated baseband transmission data signal to the phase modulator; and an I channel quadrature mixer and a Q channel quadrature mixer receiving a reception signal received via an antenna and the pulse signals output from the I channel adder and Q channel adder, respectively, and outputting baseband signals.

13. The UWB transceiver of claim 12, wherein the variable time delayer comprises:

a phase lag loop outputting a plurality of signals delayed by integer times the clock signal output from the clock generator; and a clock multiplexer selecting some of the signals output from the phase lag loop.

* * * * *